US009837091B2

(12) United States Patent
Leff et al.

(10) Patent No.: US 9,837,091 B2
(45) Date of Patent: Dec. 5, 2017

(54) AUDIO-VISUAL DIALOGUE SYSTEM AND METHOD

(71) Applicant: UCL Business PLC, London (GB)

(72) Inventors: Julian Leff, London (GB); Geoffrey Williams, Chelmsford (GB); Mark Huckvale, Chelmsford (GB)

(73) Assignee: UCL Business PLC (GB)

( * ) Notice: Subject to any disclaimer, the term of this patent is extended or adjusted under 35 U.S.C. 154(b) by 0 days.

(21) Appl. No.: 14/913,876

(22) PCT Filed: Aug. 19, 2014

(86) PCT No.: PCT/GB2014/052544
§ 371 (c)(1),
(2) Date: Feb. 23, 2016

(87) PCT Pub. No.: WO2015/025155
PCT Pub. Date: Feb. 26, 2015

(65) Prior Publication Data
US 2016/0203827 A1  Jul. 14, 2016

(30) Foreign Application Priority Data
Aug. 23, 2013 (GB) .................................. 1315142.8

(51) Int. Cl.
G10L 21/00 (2013.01)
G10L 13/02 (2013.01)
(Continued)

(52) U.S. Cl.
CPC .......... *G10L 19/125* (2013.01); *G06T 13/205* (2013.01); *G06T 13/40* (2013.01);
(Continued)

(58) Field of Classification Search
CPC ................... G10L 2021/0135; G10L 21/0356
See application file for complete search history.

(56) References Cited

U.S. PATENT DOCUMENTS 5,307,442 A * 4/1994 Abe ...................... G10L 13/033
704/270
5,327,521 A * 7/1994 Savic ...................... G10L 21/00
704/200

(Continued)

OTHER PUBLICATIONS

Stylianou, Yannis. "Voice transformation." Springer handbook of speech processing. Springer Berlin Heidelberg, 2008. 489-504.*

(Continued)

*Primary Examiner* — Jialong He
(74) *Attorney, Agent, or Firm* — John Bruckner PC

(57) ABSTRACT

The present invention provides an audio-visual dialogue system that allows a user to create an 'avatar' which may be customised to look and sound a particular way. The avatar may be created to resemble, for example, a person, animal or mythical creature, and generated to have a variable voice which may be female or male. The system then employs a real-time voice conversion in order to transform any audio input, for example, spoken word, into a target voice that is selected and customised by the user. The system is arranged to facially animate the avatar using a real-time lip-synching algorithm such that the generated avatar and the target voice are synchronised.

15 Claims, 11 Drawing Sheets

(51) Int. Cl.
G10L 13/033 (2013.01)
G10L 19/125 (2013.01)
G10L 13/10 (2013.01)
G10L 19/06 (2013.01)
G10L 25/24 (2013.01)
G06T 13/20 (2011.01)
G06T 13/40 (2011.01)
G10L 21/10 (2013.01)

(52) U.S. Cl.
CPC .............. *G10L 13/10* (2013.01); *G10L 19/06* (2013.01); *G10L 25/24* (2013.01); *G10L 2021/105* (2013.01)

(56) References Cited

U.S. PATENT DOCUMENTS

| | | | | |
|---|---|---|---|---|
| 6,336,092 | B1* | 1/2002 | Gibson | G10H 1/366 704/207 |
| 6,615,174 | B1* | 9/2003 | Arslan | G10L 13/033 704/217 |
| 6,970,820 | B2* | 11/2005 | Junqua | G10L 13/04 704/258 |
| 2007/0074114 | A1* | 3/2007 | Adjali | G06F 3/01 715/706 |
| 2008/0151786 | A1* | 6/2008 | Li | H04L 65/607 370/276 |
| 2009/0135177 | A1* | 5/2009 | Strietzel | G06Q 30/0247 345/419 |
| 2009/0177300 | A1* | 7/2009 | Lee | G11B 20/10527 700/94 |
| 2009/0278851 | A1* | 11/2009 | Ach | G06T 13/205 345/473 |
| 2010/0201693 | A1* | 8/2010 | Caplette | G10H 1/368 345/474 |
| 2012/0295708 | A1* | 11/2012 | Hernandez-Abrego | A63F 13/424 463/36 |

OTHER PUBLICATIONS

Stylianou, Yannis, Olivier Cappe, and Eric Moulines. "Statistical methods for voice quality transformation." Fourth European Conference on Speech Communication and Technology. 1995.*
FaceGen Modeller User Manual. retrieved from www.archive.org, archived on Mar. 17, 2012.*
Huckvale, Mark, Julian Leff, and Geoff Williams. "Avatar therapy: an audio-visual dialogue system for treating auditory hallucinations." INTERSPEECH. 2013.*
Written opinion from PCT/GB2014/052544 dated Nov. 26, 2014.
International Search Report from PCT/GB2014/0552544 dated Nov. 26, 2014.
J. Leff et al., "Computer-assisted therapy for medication-resistant auditory hallucinations: proof-of-concept study", The British Journal of Psychiatry, vol. 202, No. 6, Feb. 21, 2013.
Yannis Stylianou et al., "Continuous probabilistic Transform for voice comparison", IEEE Transactions on speach and audio processing, vol. 6, No. 2, Mar. 1, 1998.
T Dutoit et al., "Multimodal speaker conversion—his master's voice . . . and face", einterface '06—Summer Workshop on Multimodal Interfaces 2006, Jan. 1, 2006.

* cited by examiner

AUDIO-VISUAL DIALOGUE SYSTEM AND METHOD

TECHNICAL FIELD

The present invention relates to an audio-visual dialogue system and method. In particular, but not exclusively, aspects of the present invention relate to an audio-visual dialogue system and method including real-time voice conversion, facial animation and voice customisation.

BACKGROUND TO THE INVENTION AND PRIOR ART

Spoken dialogue systems are regularly used in a wide range of technical fields, for example, in mobile telephone devices to process the user's speech and transmit it to a receiving communications device. Spoken dialogue systems commonly employ a combination of speech synthesis and speech recognition techniques. Speech synthesis techniques are often used in entertainment productions such as video games and animated files, but it can also be a useful tool in assistive technology for people with a range of disabilities, for example, visual and speech impairment, and dyslexia.

A common speech synthesis technique is a text-to-speech (TTS) system, wherein raw text is analysed, converted into phonetic representations and then converted via wave form generation into speech. However, TTS can experience problems identifying the correct pronunciation for certain aspects of text, for example, numbers, abbreviations, and spellings that have different pronunciations depending on the context of the word. As a result, TTS can be a lengthy and complex process, and therefore, it is often necessary to know the text well in advance of the speech synthesis. In view of this, TTS systems are not suitable for real-time voice conversion.

The treatment of auditory hallucinations have been reported by a number of media publications. News articles published by the BBC and 'The Guardian' newspaper both discuss the possibility of using virtual reality (VR) techniques to produce an 'avatar' that represents the 'voice' heard by schizophrenic patients in order to help them gain control of their hallucinations: A further BBC news article reports how the technology used in the clinical trial is able to tune the voice of the virtual avatar, supplied by the therapist, to match the voice of the patient's auditory hallucination.

SUMMARY OF INVENTION

The present invention provides an audio-visual dialogue system that allows a user to create an 'avatar' which may be customised to look and sound a particular way. The avatar may be created to resemble, for example, a person, animal or mythical creature, and generated to have a variable voice which may be female or male. The system then employs a real-time voice conversion in order to transform an audio input, for example, spoken word, into a target voice that is selected and customised by the user. The system is arranged to facially animate the avatar using a real-time lip-synching algorithm such that the generated avatar and the target voice are synchronised. That is to say, the avatar appears to say the words of an audio input in the target voice. The present invention may be used for multiple applications, for example, gaming software and film animation.

One particular application of the present invention is the treatment of schizophrenia, wherein patients who suffer from hearing voices may create a visual and audio representation of their auditory hallucination in the form of the avatar. The patient can customise the visual appearance of the avatar and customise the avatar's voice so that it closely resembles their auditory hallucination. Once the patient has designed their avatar, a therapist can speak to the patient via the avatar so that the patient can confront their hallucination and engage in conversation with it, thus enabling them to gain control of the illness.

In view of the above, one aspect of the present invention provides an audio-visual dialogue system comprising an audio input device, an audio output device, a visual output device and a processor. The processor is arranged to receive an input audio signal representing a source voice from the audio input device, perform substantially real-time voice conversion on the input audio signal to produce an output audio signal representing a target voice, wherein the output audio signal is provided to the audio output device, generate an avatar, wherein the avatar is visually displayed on the visual output device, and facially animate the generated avatar, wherein the animation is synchronised with the output audio signal.

In one embodiment, the substantially real-time voice conversion includes decomposing the input audio signal into a set of time-varying filter characteristics and a residual excitation signal, spectrally transforming the time-varying filter characteristics, and/or modifying the pitch of the residual excitation signal, and synthesising the output audio signal in dependence on the transformed time-varying filter characteristics and/or the pitch modified residual excitation signal.

Preferably, decomposing the input audio signal is performed via a linear prediction coding process. It should be noted that the time-varying filter characteristics relate to the prediction coefficients of the linear prediction speech processing.

In another embodiment, the time-varying filter characteristics are estimated over short windowed sections of the input audio signal. Preferably, the short windowed sections of the input audio signal are 20 to 40 ms in duration and overlapping by 5 to 15 ms. Additionally, the prediction error of the linear prediction coding may be calculated separately for short windowed sections, the prediction errors being subsequently overlapped and added to produce the residual excitation signal.

In one preferred embodiment, the time-varying filter characteristics are Fourier transformed into a multiple point, for example, 256 point, amplitude response prior to spectral transformation of the time-varying filter characteristics. Preferably, the spectrally transformed amplitude response is then inverse Fourier transformed back into the time-varying filter characteristics.

In another embodiment, modifying the pitch includes re-sampling the residual excitation signal, and changing the fundamental frequency of the re-sampled residual excitation signal by a constant pitch scaling factor. Furthermore, the change in duration of the residual excitation signal caused by the re-sampling may be corrected by compressing or stretching the residual excitation signal in time to restore the original duration.

According to one embodiment, spectrally transforming the time-varying filter characteristics is performed by a set of linear transformations. Sets of linear transformations may then be generated between the input audio signal and a plurality of predefined target voices. In one embodiment, more than 50 predefined target voices are used to generate the sets of linear transformations. Preferably, at least 82 target voices are used, including at least 40 males target speakers and at least 42 female target speakers. Particularly, in one embodiment, a set of 8 linear transforms may be generated between the input audio signal and a predefined target voice. In other embodiments, 16, 24 or other numbers may be used.

In another preferred embodiment, the signal spectral envelope of the input audio signal is modeled using a Gaussian Mixture Model, wherein the Gaussian Mixture Model may comprise at least 8 mixtures, and wherein the mixtures of the Gaussian Mixture Model may each be associated with a linear transform. The Gaussian Mixture Model may comprise other numbers of mixtures in other embodiments. The final linear transform applied to the time-varying filter characteristics is then the sum of the set of linear transforms weighted according to the mixture probability for the signal spectral envelope of the input audio signal.

Preferably, the Gaussian Mixture Model is based on the features of the mel-frequency cepstrum coefficients of the input audio signal, and the mixture probability is the probability that the mel-frequency cepstrum coefficients could have been generated by the mixtures of the Gaussian Mixture Model. The Gaussian Mixture Model may be used to train the sets of linear transforms of the plurality of predefined target voices.

According to another embodiment, a plurality of sentences may be spoken by both the plurality of predefined target voices and the input audio signal and preferably, in one embodiment, at least 20 sentences are spoken. The plurality of sentences spoken by the input audio signal and the plurality of sentences spoken by the plurality of predefined target voices are then temporally aligned. The plurality of sentences may be temporally aligned using the mel-frequency cepstrum coefficients in combination with a dynamic programming algorithm.

In one embodiment, for a plurality of signal sections within the temporally aligned pairs of sentences, the prediction coefficients and linear prediction coding spectrum are calculated, and the optimum frequency mapping is found using a dynamic programming algorithm.

Preferably, the frequency mappings for the plurality of signal sections and the set of Gaussian Mixture Model mixture probabilities for the input audio signal are used to find the set of linear transforms which minimise the mean squared transformation error. In one particular embodiment, a set of 8 linear transformations may be found. Other numbers of transformations may be used in other embodiments.

In a preferred embodiment, the processor is further arranged to customise the real-time voice conversion, the customisation comprising selecting one of the plurality of predefined target voices, wherein the predefined target voices are represented by a set of time-varying filter characteristics and a pitch scaling factor, and adjusting the transformed time-varying filter characteristics and/or the pitch scaling factor of the selected predefined target voice to give customised target voice parameters. Preferably, the parameters of the selected predefined target voice are adjusted using a plurality of sliders displayed on a user interface.

The selected predefined target voice may be associated with a set of linear transformations. Preferably, the transform vectors of the set of linear transforms are reduced to a mean transform vector and a plurality of orthogonal change vectors, wherein a slider may be used to adjust the amount by which a change vector is added into the mean vector such that the time-varying filter characteristics are adjusted.

According to a further embodiment, the processor is further arranged to facially customise the generated avatar, wherein facially customising the generated avatar may include providing a visual array of distinct faces for selection. Preferably, the visual array of distinct faces includes at least 250 distinct faces. Furthermore, the visual array of distinct faces may vary in gender, age, ethnicity and hairstyle, and a range of accessories and further hairstyles may be available for selection.

Another aspect of the present invention provides a method of audio-visual dialogue, comprising receiving an input audio signal representing a source voice from an audio input device, performing substantially real-time voice conversion on the input audio signal to produce an output audio signal representing a target voice, wherein the output audio signal is provided to an audio output device. The substantially real-time voice conversion includes decomposing the input audio signal into a set of time-varying filter characteristics and a residual excitation signal, spectrally transforming the time-varying filter characteristics, and/or modifying the pitch of the residual excitation signal, and synthesising the output audio signal in dependence on the transformed time-varying filter characteristics and/or the pitch modified residual excitation signal. The method further comprises generating an avatar, wherein the avatar is visually displayed on a visual output device, and facially animating the generated avatar, wherein the animation is synchronised with the output audio signal.

BRIEF DESCRIPTION OF DRAWINGS

The present invention will now be described by way of example only, and with reference to the accompanying drawings in which.

DETAILED DESCRIPTION OF PREFERRED EMBODIMENTS

Overview

The present invention proposes a highly novel speech-technology system for delivering CBT-based therapy for auditory hallucinations, which is termed 'Avatar Therapy'.

Figure 1:
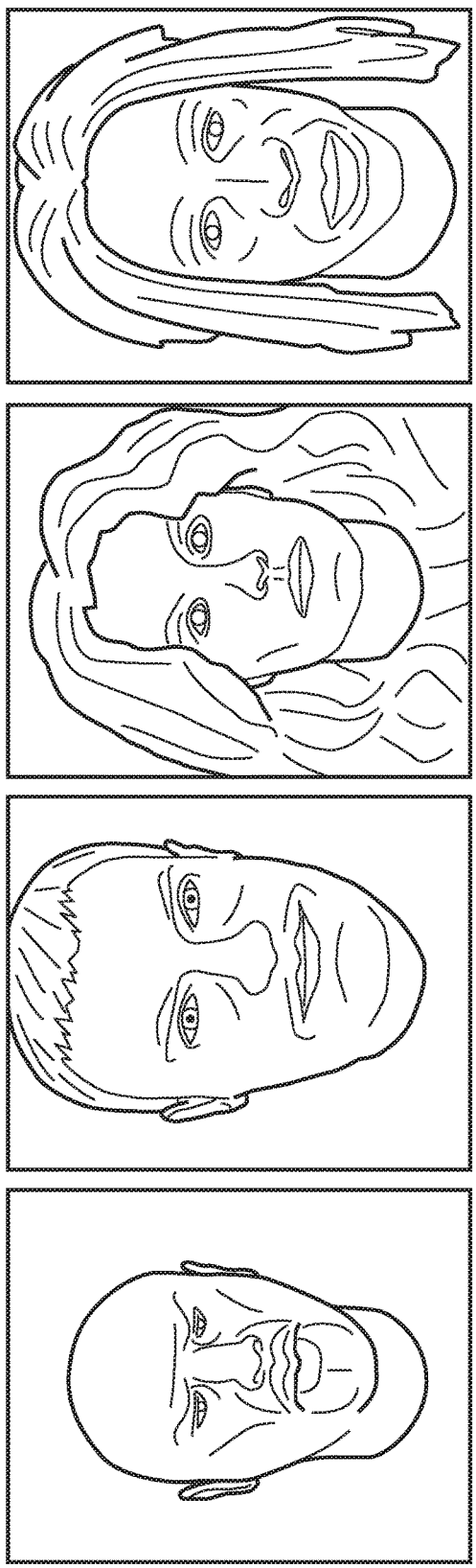
FIG. 1 illustrates a set of example avatars chosen by patients.

The basis of the system is a series of components for creating and operating an individualised avatar that "speaks" in the voice that the patient hears, and visually resembles the face that the patient perceives. In cases where the patient does not clearly perceive a face, he/she is asked to choose a face which they would feel comfortable talking to. Characteristics of the avatar are chosen in consultation with each patient beforehand using a series of computerised tools. A sample set of avatar images chosen by patients is shown in FIG. 1.

During the therapy sessions, the therapist and the patient sit in front of a computer screen in separate rooms and communicate via a two-way audio link. The avatar's utterances are voiced by the therapist, and the patient's responses to the avatar are fed back (audio only), so that the patient can interact with and challenge the avatar. The voice of the avatar is produced by modifying the therapist's speech in real time, so that the therapist's speech is voiced by the avatar in the simulated voice on the client's computer with lip synchronisation. Over the same channel, the therapist can also communicate instructions or advice and encouragement to the patient in his/her own voice, as would be the case in a standard therapy session. Results of a small-scale RCT study funded by NIHR are reported in [9] and further discussed in [10].

Introduction

The phenomenon of auditory hallucinations ("hearing voices") is an enduring problem in the treatment of serious mental illness such as schizophrenia. About 30% of people with this diagnosis continue to experience hallucinations and delusions despite treatment with antipsychotic medication [1]. Hearing voices is not only distressing to the sufferers, it also has a serious impact on their carers and members of the public with whom they come into contact. Auditory hallucinations manifest in a number of ways, including voices that speak aloud what the patient is thinking, voices giving a running commentary on the patient's actions or external imagined events, two or more persons conversing, often referring to the patient in the third person, and commands ordering the patient to perform certain actions (often violent). Persistent voices severely limit the patients' ability to concentrate on tasks, and hence hinder attempts at rehabilitation. The direct treatment costs in the United Kingdom are estimated at £2 billion annually, while the indirect costs, including loss of employment for the patients and carers, amount to another £2 billion [2].

In the past 15 years or so in Britain a number of randomised controlled trials (RCTs) have been conducted to test the value of cognitive-behavioural therapy (CBT) for persistent medication-resistant symptoms of psychosis [3, 4, 5, 6]. While these have shown some effect in reducing auditory hallucinations, they have been criticised on grounds of experimental design. One more recent RCT of CBT, while not affecting the frequency or intensity of auditory hallucinations, did succeed in reducing the power of the dominant voice as perceived by the patients, and their distress [7].

When asked about the worst aspect of hearing persecutory voices, many patients report 'the feeling of helplessness' it induces. Those who are able to establish a dialogue with their voice feel much more in control and their suffering is consequently reduced. Many voice hearers also visualise a face associated with their voice. This can be the face of someone known to them, a well-known personality or an imaginary figure, or perhaps representing an angel, devil or other religious or mythical figure. One means by which a patient could be helped to gain control of their voice is by creating a virtual avatar that represents the person they believe talks to them, and then allowing the avatar to progressively come under the patient's control. To embody the voice within the context of an avatar therefore, is a natural step to make from a clinical point of view.

Virtual reality (VR) techniques have previously been explored for modelling the psychotic episodes involved in schizophrenia. Banks et al [8] report a sophisticated VR environment for simulating auditory and visual hallucinations and motivate its use in medical education, but have not tested their system in a clinical setting, nor attempted to individualise features of the voices.

System Design Considerations

Generating the Avatar Utterances

An important parameter in the design of a dialogue system with a synthetic voice is the method of generating the synthetic utterances, either by directly synthesising speech with the desired characteristics, or by transforming natural speech to produce a different quality to that of the original speaker. Since the content of the therapist's utterances to be voiced by the avatar cannot be known in advance, a standard text-to speech (TTS) system is of no use in the present invention. Typing in text during the therapy sessions would introduce frequent unacceptably long delays, disrupting the flow of the dialogue. Therefore, to allow as near real-time interaction as possible, a system based on voice conversion rather than speech synthesis is utilised.

The design parameters of the experimental study required that the target voice and face be generated in an initial enrolment session with each patient, lasting no more than an hour. Ideally this would be followed by the first of the series of therapy sessions, meaning that the avatar must be obtained in its final form during the enrolment session. Subjects were recruited continuously throughout the study and so the target voices and voices were not available in advance of the technology development.

In conventional applications of voice conversion where the set of target speakers is known in advance, a training procedure is applied to produce the mapping, or transform, from the source to the target voice. This requires the availability of speech training data from both source and target speakers. In the development of the present invention, the major technical problem was the fact that the target voices are not known until the patients have been enrolled and, of course, no actual samples could be obtained in any case. This means that the mappings cannot be trained individually and that a set of predetermined voice transforms must be developed instead, using the therapist's voice as the source. While this limits the range of voices that can be delivered in good quality, a variety of different voices can still be produced, provided some additional means of fine-tuning the transforms is available.

System Components for Enrolment and Therapy

The system comprises a combination of off-line and on-line procedures and includes a real-time voice conversion system, voice and face customization (enrolment) systems, a customizable facial animation system with real-time lip-synching, and a two-way audio channel with switching between therapist and avatar voice.

In the off-line, or enrolment procedures, the patient chooses the appropriate voice and face using a set of computer-based tools, assisted by a trained operator and supervised by the therapist. It should be noted that some of these tools are commercially available products or software toolkits that have been customised to suit the needs of the present invention.

Real-Time Voice Conversion System
Linear Prediction Speech Processing

Speech signals are produced by excitation signals produced in the throat which are the modified depending on the shape of the vocal tract. In order to analyse and synthesise speech, the speech signals must be decomposed into its separate components and considered independently. One way of achieving this is linear prediction speech processing wherein the speech signal is modeled as a weighted sum of the p previous samples of speech, plus a residual excitation waveform, which may also be referred to as the prediction error. The speech signal maybe expressed as:

$$x(n) = \varepsilon(n) + \sum_{k=1}^{p} a_k y(n-k) \quad (1)$$

Where $x(n)$ is the speech signal, $\varepsilon(n)$ is the prediction error, $a_k$ are the prediction coefficients and $$\sum_{k=1}^{p} a_k y(n-k)$$

is the weighted sum of the p previous samples of speech.

Figure 5A:
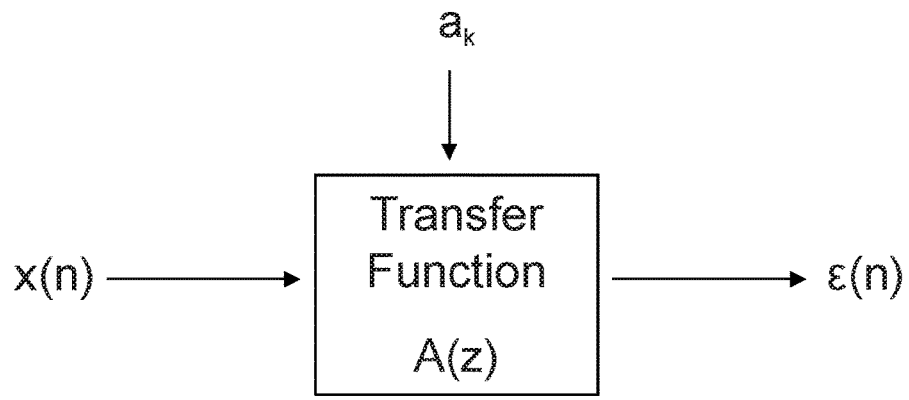
FIG. 5a is a schematic illustrating speech signal analysis.

Therefore for a given speech signal, a transfer function is applied which decomposes the speech signal into the two components, as shown by FIG. 5a, whereby the transfer function is expressed as:

$$A(z) = 1 - \sum_{k=1}^{p} a_k z^{-k} \quad (2)$$

Figure 5B:
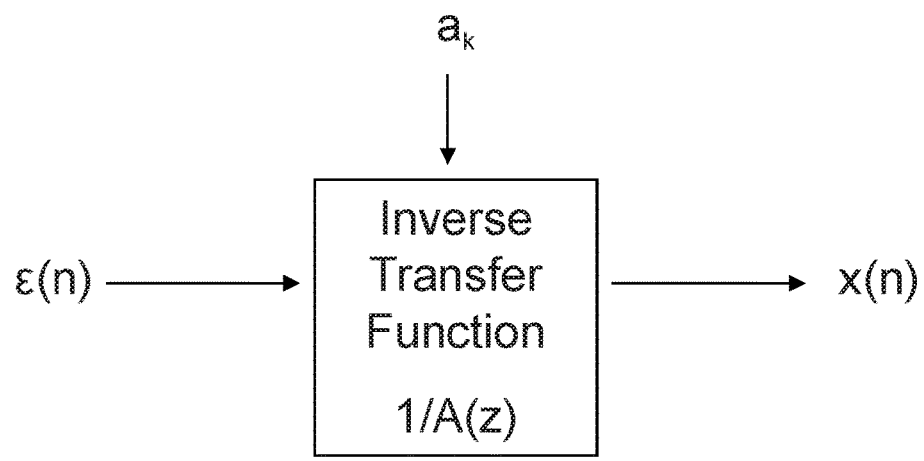
FIG. 5b is a schematic illustrating speech signal reconstruction.

Conversely, for a given prediction error the inverse of the transfer function may be applied, allowing the speech signal to be reconstructed, as shown by FIG. 5b. That is to say, it is possible to model the excitation signal that led to the speech signal.

The speech signal is sampled over short windowed sections, and in order to decompose or reconstruct the speech signal, prediction coefficients $a_k$ for the transfer function must be calculated such that they minimise the mean-squared prediction error $\varepsilon(n)$. The prediction error of the linear prediction model is essentially the difference between the actual speech signal and the predicted speech signal, and its mean-squared value is indicative of the energy in the residual excitation waveform. Two common techniques of minimising the mean-squared prediction error and calculating the prediction coefficients include the covariance method and the autocorrelation method. Both techniques result in a matrix of equations which may be solved via some universal algorithm. Once these prediction coefficients have been calculated it is possible to decompose the speech signal, manipulate the components of the speech signal and then reconstruct the speech signal.

Additionally, the frequency response of the linear prediction model corresponds to the spectral envelope of the speech signal and is free from pitch harmonics. It is the spectral envelope that provides the characteristics of the vocal tract. The shape of the spectral envelope depends on the number of parameters that are used in the linear prediction model, that is the number of p previous samples used to model the speech signal. As p increases, the more pitch harmonics are captured. Therefore, if p is chosen to be too high, the spectral peaks capture these pitch harmonics. However, if p is chosen to be too low, the key areas of resonance will be missing from the spectra. As a general rule, p should be chosen as twice the number of vocal tract resonances (formants) in the signal bandwidth. It should also be noted that the number of linear prediction parameters (p) has no appreciable affect on the mean-squared error of the linear prediction model.

Technology

Figure 8:
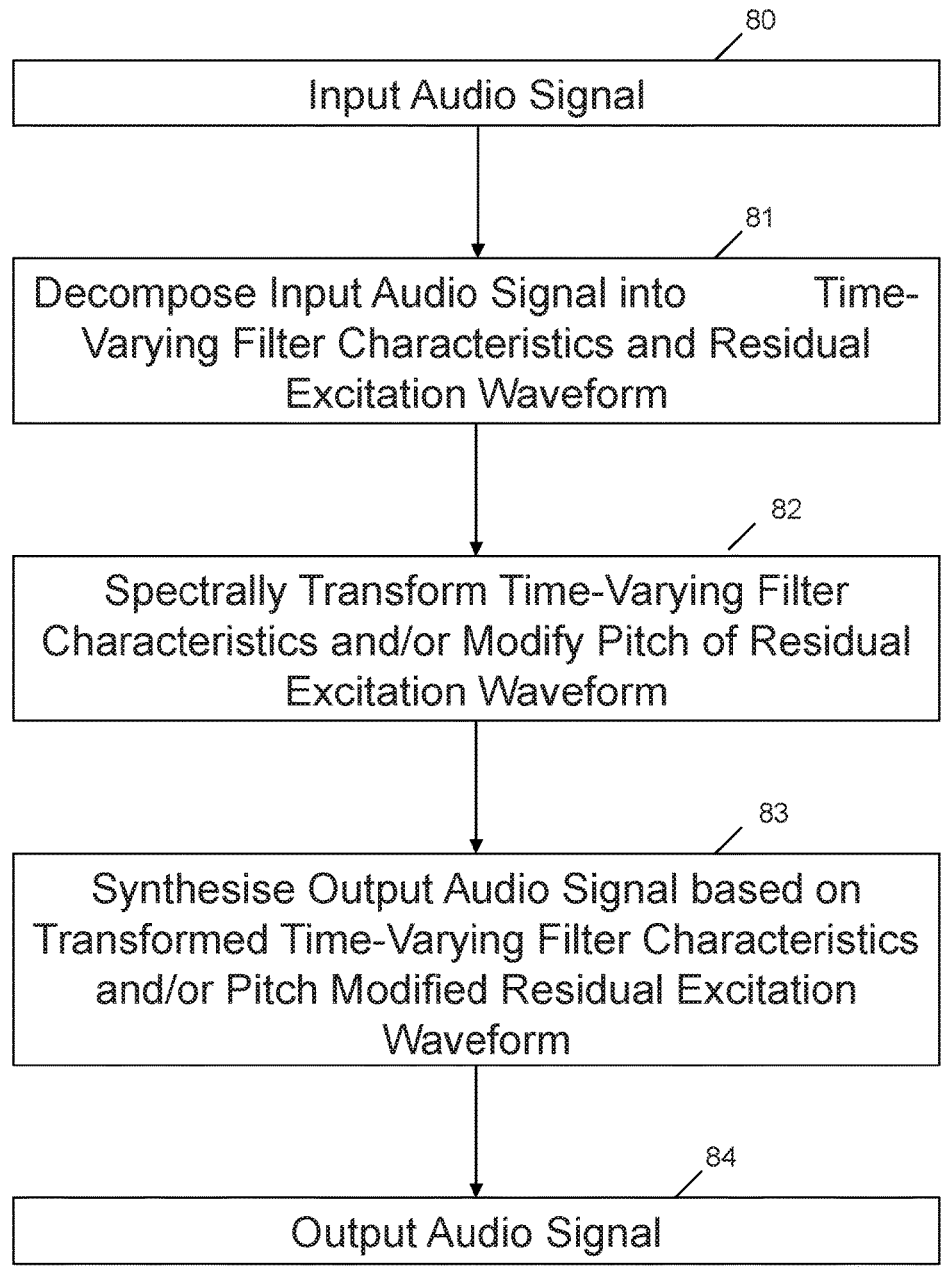
FIG. 8 is a flow diagram illustrating a method of voice conversion according to an embodiment of the present invention.

The voice conversion technology is broadly based on the approach described by Stylianou [11]. In this approach, as illustrated by FIG. 8, speech is decomposed into two elements: a time-varying filter and a residual excitation waveform (step 81). Spectral transformations of the filter combined with pitch modification (step 82) of the residual allow the synthesis (step 83) of versions of an utterance in which the characteristics of the speaker seem to have changed.

Decomposition of the speech is performed by linear prediction, as described above, with the prediction filter being estimated over short windowed sections of the signal 30 ms in duration, and overlapping by 10 ms. In other embodiments, other window lengths and overlaps may be used. The prediction error of the filter is then calculated separately for each window, and then overlapped and added to create the excitation residual waveform. To make the prediction coefficients more amenable to spectral mapping, the prediction coefficients are Fourier transformed into a multi-point, for example, 256 point, amplitude response. This transformation is just a mathematical convenience, allowing the filter response to be adjusted by a spectral warping function for transformation of the voice characteristics. For synthesis, the warped spectrum is then converted back to predictor coefficients. With a uniform spectral warping, the conversion to and from the amplitude response does not introduce noticeable signal distortion.

Spectral manipulation of the filter response is performed by a set of linear transforms (step 82). In this work, a set of 8 transforms is used for each target voice, the exact forms of which are found during the training and customization procedure described below. To select how the transforms are used for a given stretch of speech signal, the signal spectral envelope for the source speaker is modeled using a Gaussian Mixture Model (GMM) of 8 mixtures. Performance can be improved with 64 mixtures [11,12], but as the voice conversion system of the present invention is designed for flexibility and real-time operation, with no concept of "accurately" recreating a specific voice, 8 mixtures constitute the best compromise between the required quality and minimal computational load. Each mixture is then associated with a linear transform and the final transform applied to the filter is found from the sum of transforms weighted according to the mixture probability for the corresponding source speech signal envelope. See [11] for a mathematical description.

For pitch scaling, the residual signal from the source speaker is first re-sampled to change the fundamental frequency by a constant factor. To correct for the change in duration caused by the re-sampling, the residual is then compressed or stretched in time to restore the original duration using Waveform-Similarity Overlap-Add (WSOLA, see [13]).

Figure 9:
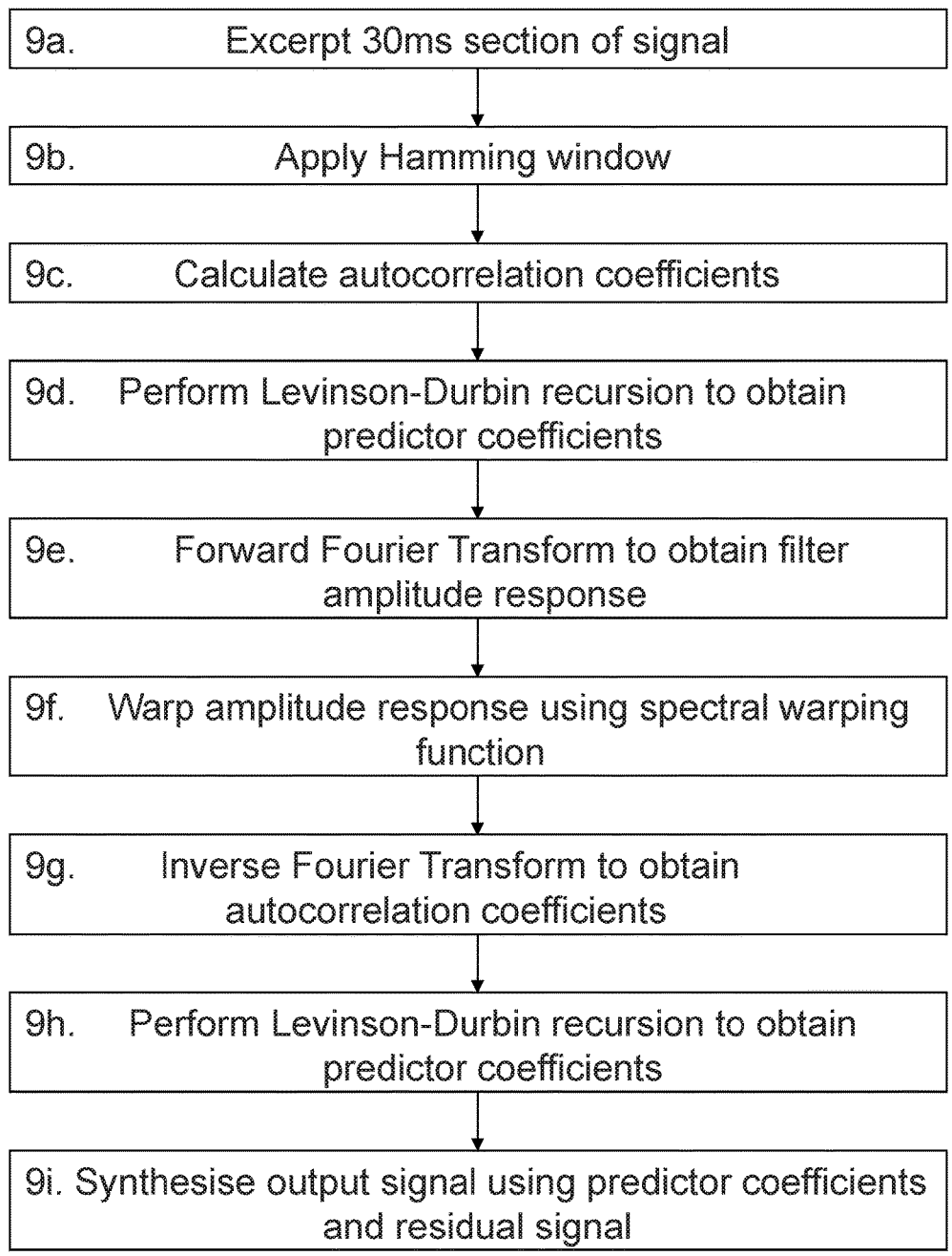
FIG. 9 is a flow diagram illustrating the spectral warping procedure according to an embodiment of the present invention.
Figure 10:
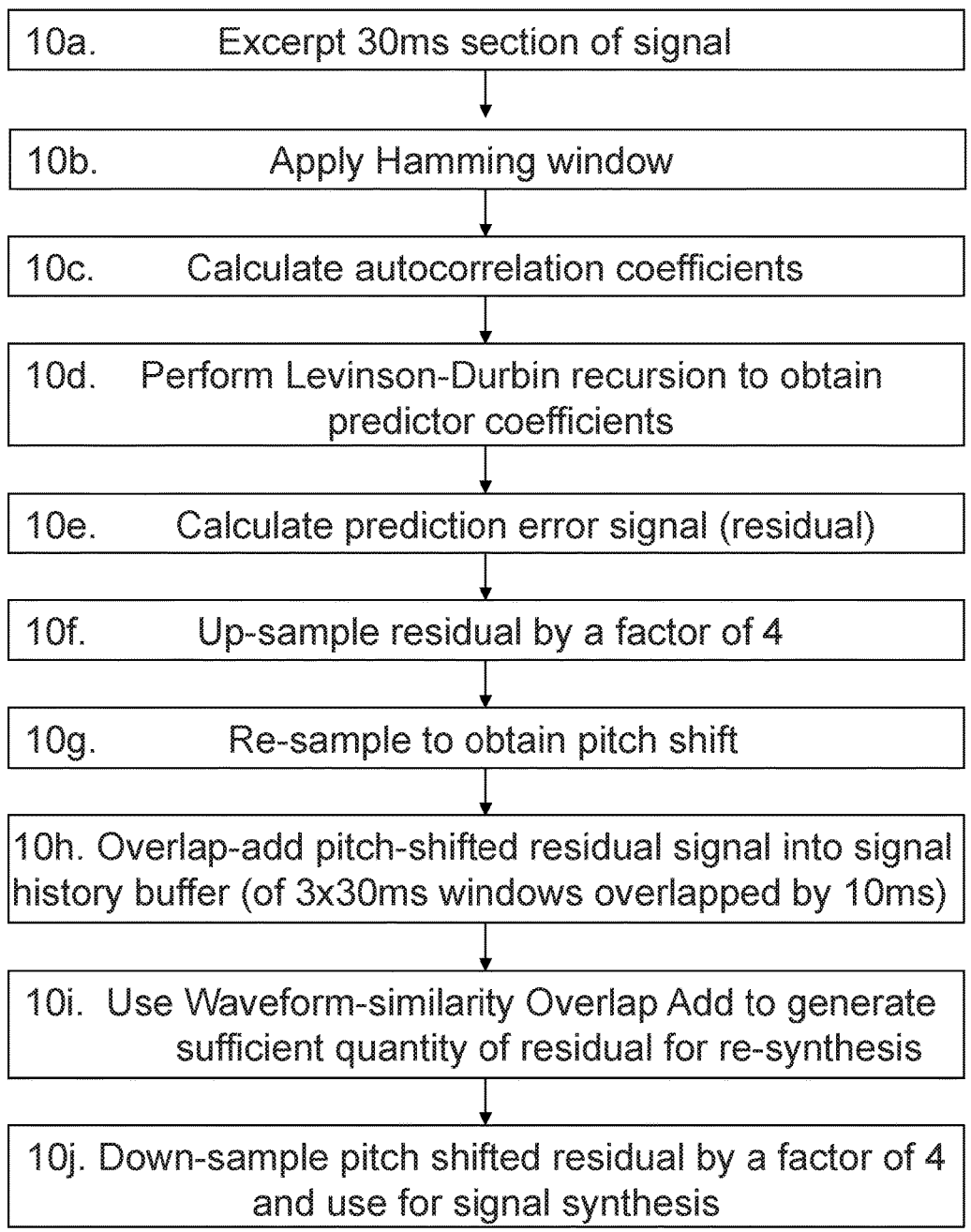
FIG. 10 is a flow diagram illustrating the residual pitch shifting procedure according to an embodiment of the present invention.
Figure 11:
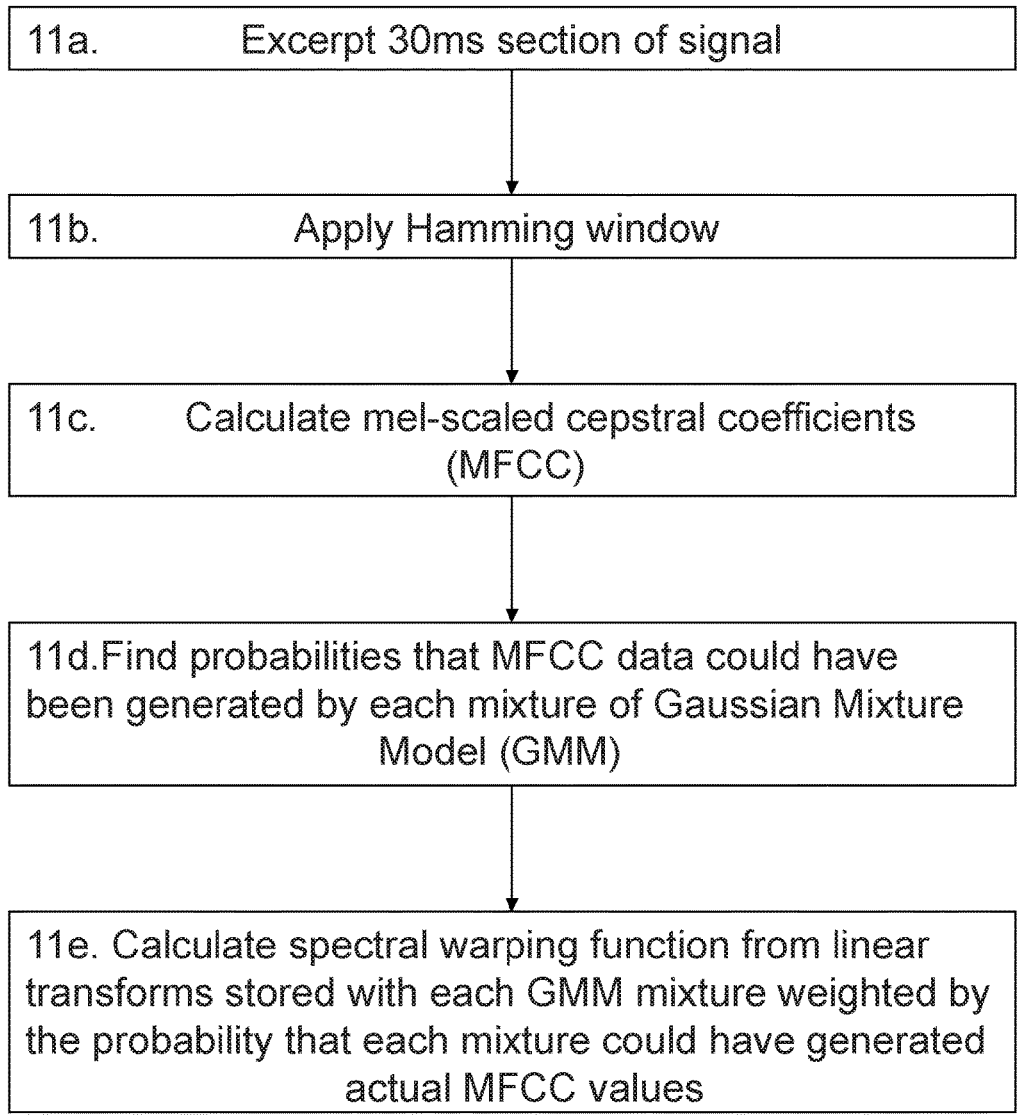
FIG. 11 is a flow diagram illustrating the procedure for generating the spectral warping function according to an embodiment of the present invention.

FIGS. 9 to 11 illustrate, by way of example, procedures for spectral warping, residual pitch shifting and generation of the spectral warping function that are to be used in the voice conversion. The voice conversion begins by sampling the source speech signal in signal sections of 30 ms (9-11a), overlapping by 10 ms. These signal sections are then windowed using a Hamming window function (9-11b) in order to set all values outside of $0 \leq n < N$ to zero. From this windowed signal, the spectral warping procedure shown in FIG. 9, and the pitch shifting procedure shown in FIG. 10 can be performed. The prediction filter coefficients of the windowed signal are calculated via the autocorrelation method to first find a set of autocorrelation coefficients (9-10c), and the Levinson-Durbin Recursive Method to then find the prediction coefficients (9-10d). Once these have been found, the prediction coefficients are Fourier transformed to obtain the amplitude response (9e), and the amplitude response can then be warped using a spectral warping function (9f), calculated for that windowed signal.

To obtain the spectral warping function, as shown by FIG. 11, the mel-scaled cepstral coefficients (MFCC) (11c) for the windowed signal are calculated. Additionally, the spectral enveloped for the windowed signal is modelled by a Gaussian Mixture Model (GMM) of 8 mixtures and the probabilities that the MFCC data could have been generated by each mixture of the GMM are found (11d). Each mixture is associated with a linear transform (corresponding to target voices), and the sum of these linear transforms weighted by the above probabilities gives the spectral warping function to be applied to the amplitude response (11e).

Once the spectral warping function has been applied to the amplitude response, the resulting warped amplitude response is inverse Fourier transformed to obtain a corresponding set of autocorrelation coefficients (9g). Then, using the Levinson-Durbin recursive method, the autocorrelation coefficients are used to obtain a set of warped prediction coefficients (9h).

The second stage of the voice conversion is to modify the pitch of the speech signal. The prediction coefficients of each windowed signal, as described above, are used to calculate the prediction error of the windowed signals, and then the prediction errors are overlapped and added to obtain the residual signal of the speech signal (10e). This residual signal is up-sampled by a factor of 4 (10f) such that the sample rate is increased, and the up-sampled residual signal is re-sampled to obtain the shift the pitch of the residual signal (10g). The pitch-shifted residual signal is then overlap-added into a signal history buffer of 3×30 ms windows overlapped by 10 ms (10h). In order to restore the pitch-shifted signal to the original duration of the residual signal, waveform-similarity overlap-add is used to modify the time scale without affecting the pitch (10i). Lastly, the pitch-shifted residual is then down-sampled by a factor of 4 (10j).

The warped prediction coefficients and pitch-shifted residual signal can then be used to synthesise the output signal (9i) which relates to the target voice.

Training

The input to the voice customization process is a large number of trained voice transformations generated between the single source speaker (the therapist) and a number of training speakers. For the present invention, 55 speakers were taken from the Accents of British English corpus [14] and 27 speakers were taken from the UCL Speaker Variability corpus [15]. In total, 40 male and 42 female target speakers were used and in each case, a selection of 20 sentences spoken by each speaker and a matching set of 20 sentences spoken by the source speaker were obtained.

The spoken materials from the source speaker were used to build an 8-mixture GMM based on MFCC features of the signal [16]. This GMM was then used to train all 82 linear transform sets using the Stylianou method. This first involved, for the source speaker and each target speaker, a temporal alignment between each matching pair of sentences. The MFCC vectors were used for this alignment in combination with a dynamic programming algorithm. Then for each matched pair of signal sections, the predictor coefficients and LPC spectrum were calculated and the optimum frequency mapping found for that pair of frames using a dynamic programming algorithm. Given all the mappings for all paired frames in all sentences together with the set of GMM mixture probabilities for each source frame, it is possible to find the set of 8 average transforms which minimize the mean squared transformation error. In addition, the mean fundamental frequency of each speaker and the source speaker were measured. Thus for each target speaker, the training procedure generates a set of 8 linear frequency transforms and a pitch scaling factor, which taken together makes the best attempt at morphing the source speaker's voice characteristics to the target speaker (step 83).

Enrolment Procedures

Face Selection and Customisation

Figure 2:
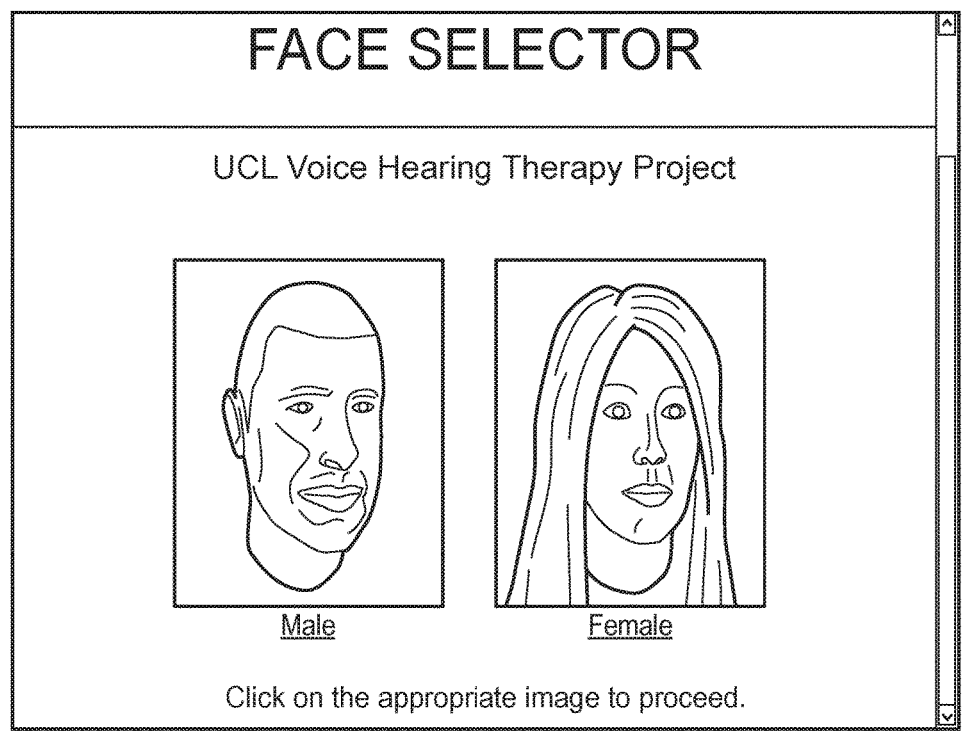
FIG. 2 illustrates the front page of the on-line Face Selector.

The face selection procedure is based around the FaceGen© Modeller software developed by Singular Inversions, as illustrated by FIG. 2. This allows a virtually infinite range of 3-D faces to be created and saved in various file formats. As a starting point in the selection, a visual array or "palette" of around 250 distinct faces was created, covering a broad range of features. The faces are chosen to cover a broad range of face types which vary in gender, age and ethnic group, as well as various common hairstyles.

A limited range of hairstyles and accessories is available. Each of these files was then saved both as a FaceGen model file and as a JPEG image file. The image files were compiled into web pages which were linked together to form a web site for browsing the initial palette of faces.

Each of the images on the face selector site has an associated FaceGen model file, stored in a parallel directory structure. Once the client has chosen a suitable starting face, the corresponding face model file is easily located for further refinement in FaceGen as the client wishes. The resulting face image is exported as a set of animation targets in the .OBJ 3D graphics format. These are essentially a set of image and texture files for the pre-selected set of visemes, which are used in the facial animation system described below.

Voice Enrolment

In the pilot study, customization of the voice was performed in two stages. However, the process of the present invention is integrated into a single application. First a sample of about 20 voice transforms for the appropriate gender is chosen from the training set, and the client is asked to select which of these has the closest speaker characteristics to the required voice. In the selection screen, each speech bubble represents a different voice and when clicked, it plays out an audio file with lip-sync in the voice which it represents, as demonstrated by FIG. 3.

Figure 3:
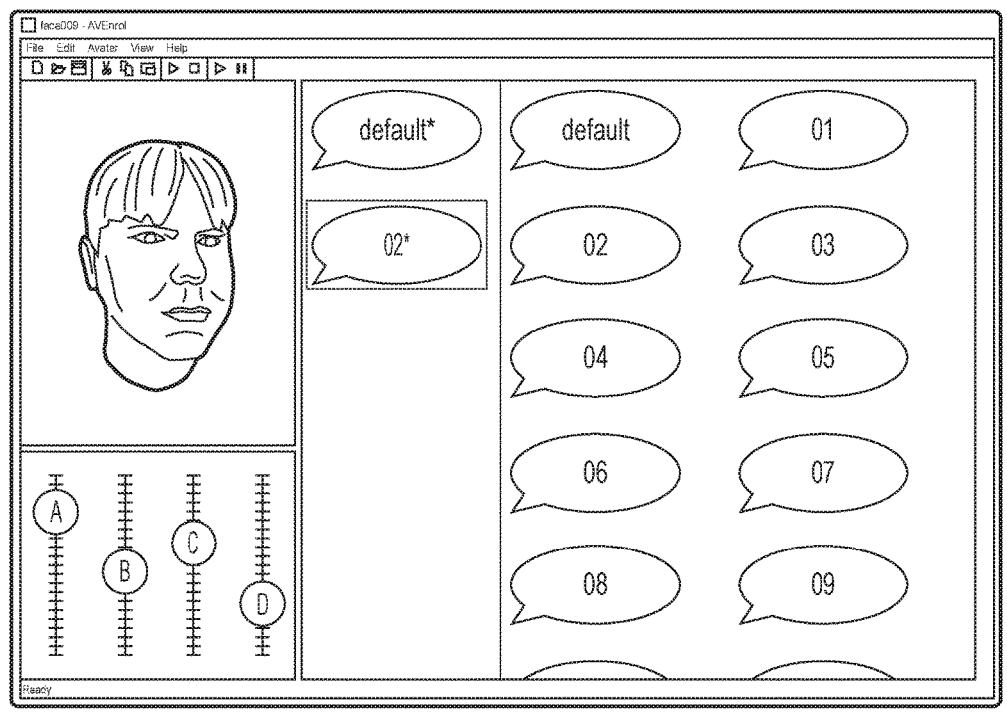
FIG. 3 illustrates the voice enrolment user interface.

In a second stage, the client manipulates the chosen transform set using a small set of sliders which alters the pitch scaling factor and the transform coefficients which may be integrated into the screen of FIG. 3. To allow for manipulation of the transforms using a small number of sliders, principal components analysis is performed on the 82 transforms estimated during training. This reduces a chosen transform vector to a mean transform vector plus a number of orthogonal change vectors. Each slider manipulates the amount by which each change vector is added in to the mean vector, and a separate slider manipulates the pitch scaling factor. The user interface is designed to allow the client to experiment with multiple variants of the chosen voice, and to keep copies of promising alternatives, such that at the end of the process, the best transform possible can be saved.

Performance Issues

During the development phase of the present invention, the voice and face selection procedures were trialed with three voice hearers who did not take part in the subsequent study. They reported a likeness accuracy of around 60-70% with respect to the target face. A similar figure was found with the patients who took part in the study. In a few cases however, the effect was more dramatic. A small number of patients, when shown the avatar for the first time, actually found the realism so great that they were unable to view it for very long.

Given the technical limitations and the requirement for all the voices to be derivable from a single source (a male speaker of around 70 years of age with a bass voice), it proved difficult in some cases to match the voice closely. Unsurprisingly, the greatest difficulty was found in matching female voices. Overall, patients reported the accuracy of the match to be in the range 60-90%. The duration of the process depends on such factors as the communicative ability of the client, the level of desired detail and the degree of customization required. It typically takes about 20 minutes, rarely less than 15 or more than 30 minutes.

Delivery System

Figure 4:
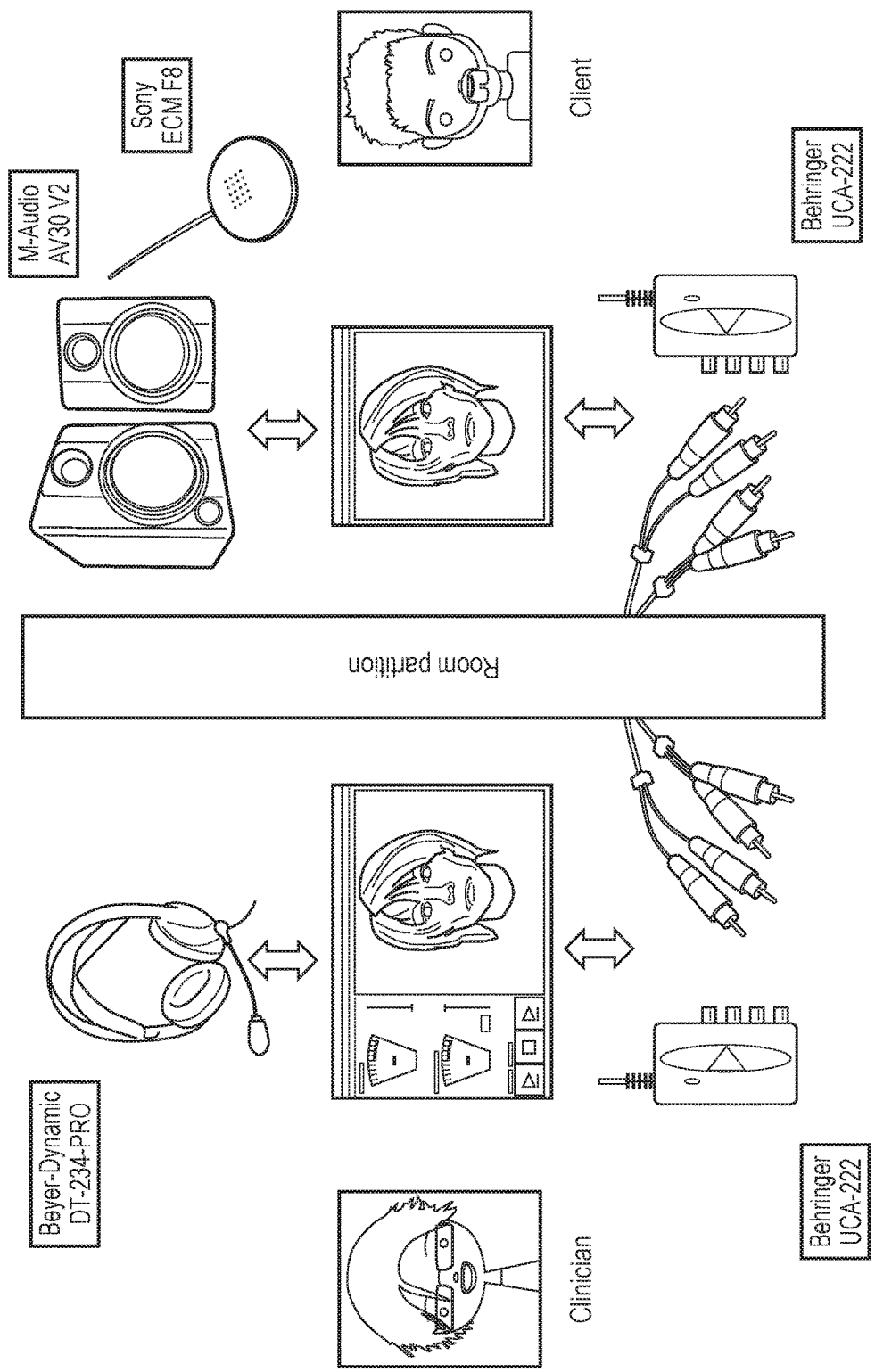
FIG. 4 illustrates delivery of the system in one embodiment of the present invention.

Delivery of the real-time converted voice is performed using custom software running on two PCs connected over a network: a "server" process running at the clinician end, and a "client" process running at the patient end. A schematic illustration of the experimental layout is shown in FIG. 4.

The server process captures audio from the therapist's microphone, and performs all the signal processing and speech conversion. The output speech is then transferred over the network to the client computer. The client process replays the converted speech and captures the patient's speech, uploading it to the therapist's computer. The therapist uses two "push-to-talk" buttons which control whether his/her natural voice or the converted voice is output to the client. The therapist listens on headphones, so that the client's responses are not fed back via the therapist's own microphone. Similarly, the client's microphone is muted while audio is being sent from the server, again to avoid feedback through the system. This has a limited but acceptable effect on the dialogue.

Crucial to creating the separation between the therapist and the avatar is ensuring that only the avatar's utterances are passed through the talking head. Since both signals are carried over the same channel, this is achieved by capturing speech in stereo at the server (therapist) end and passing the unprocessed and the converted audio through the left and right channels respectively. Only the right channel is then passed to the recognizer and lip-sync engine in the animation client, which achieves the desired effect.

Finally, the client end is equipped with a panic button which turns off the avatar immediately when pressed, displays a scenic image and plays soothing music. In the study, few clients found the need to use this facility but its presence alone proved helpful in allaying some clients' anxiety.

Further Comments

The strengths of the audio system are that voice customization and real-time delivery of a customized voice have been achieved. When the target voice is male and the transform not too large, the quality of transformation is good and relatively undistorted. The main weakness is that the range of available voices of good quality is somewhat limited, and when the required transforms are too great, there is also a loss in quality. The female voices generated from a male therapist's voice may sound somewhat strained and unconvincing to some patients.

In addition, because all of the audio processing is performed using standard sound cards and audio drivers, the processing system adds about 50 ms of delay into the dialogue. Additionally, variable delays introduced by the network link can cause more serious problems that interfere with the conduct of the session. For this reason, the system has been re-implemented to work with a direct audio link, with the audio processing re-engineered to use the Windows core audio platform, resulting in much lower latencies.

It is noted that the term 'real-time voice conversion' should be interpreted to mean that the voice conversion is conducted live such that dialogue can be exchanged between two individuals, for example, between a therapist and a patient for the treatment of auditory hallucinations. It should be clear to the skilled person that any delay added by the processing system is acceptable provided that it has no appreciable effect on the flow of conversation between the two individuals. As mentioned above, an acceptable delay may be a delay of about 50 ms or, by way of example, a delay in the range of 20 ms to 250 ms.

Facial Animation Platform—Implementation

The animation application is based on the real-time lip-sync SDK from Annosoft LLC [17]. Typically used for animating 3D talking characters in video games or films, this toolkit allows 3D characters designed in other applications to be imported in a range of formats and passed to a real-time phonetic speech recognizer which outputs lip movements. The system can work from both direct audio input and from prerecorded speech. Character information and animation targets are loaded from a simple plain-text configuration file linked to a set of graphic files, and can be pre-compiled into a binary format for faster loading and display. In the present invention, a set of 12 visemes (see, for example, [18]) may be used, including one for silence. This is found to be the best compromise between the accuracy of the mouth movements and the smoothness and speed of the response. The configuration file for each character simply specifies which animation target of the 3D model is to be used for each viseme, and which audio transform to use. Creation of the configuration files is built into the enrolment programs, based on a predetermined list of phoneme-viseme mappings.

Estimation of lip shapes improves if the recognizer has access to longer stretches of speech, which results in a tradeoff between lip-synching accuracy and response latency. The best compromise obtained has a latency value of 150 ms.

An embodiment of the present invention will now be described that implements the techniques described above. As such, the techniques will not be described again, and the details thereof are incorporated by reference.

Figure 6:
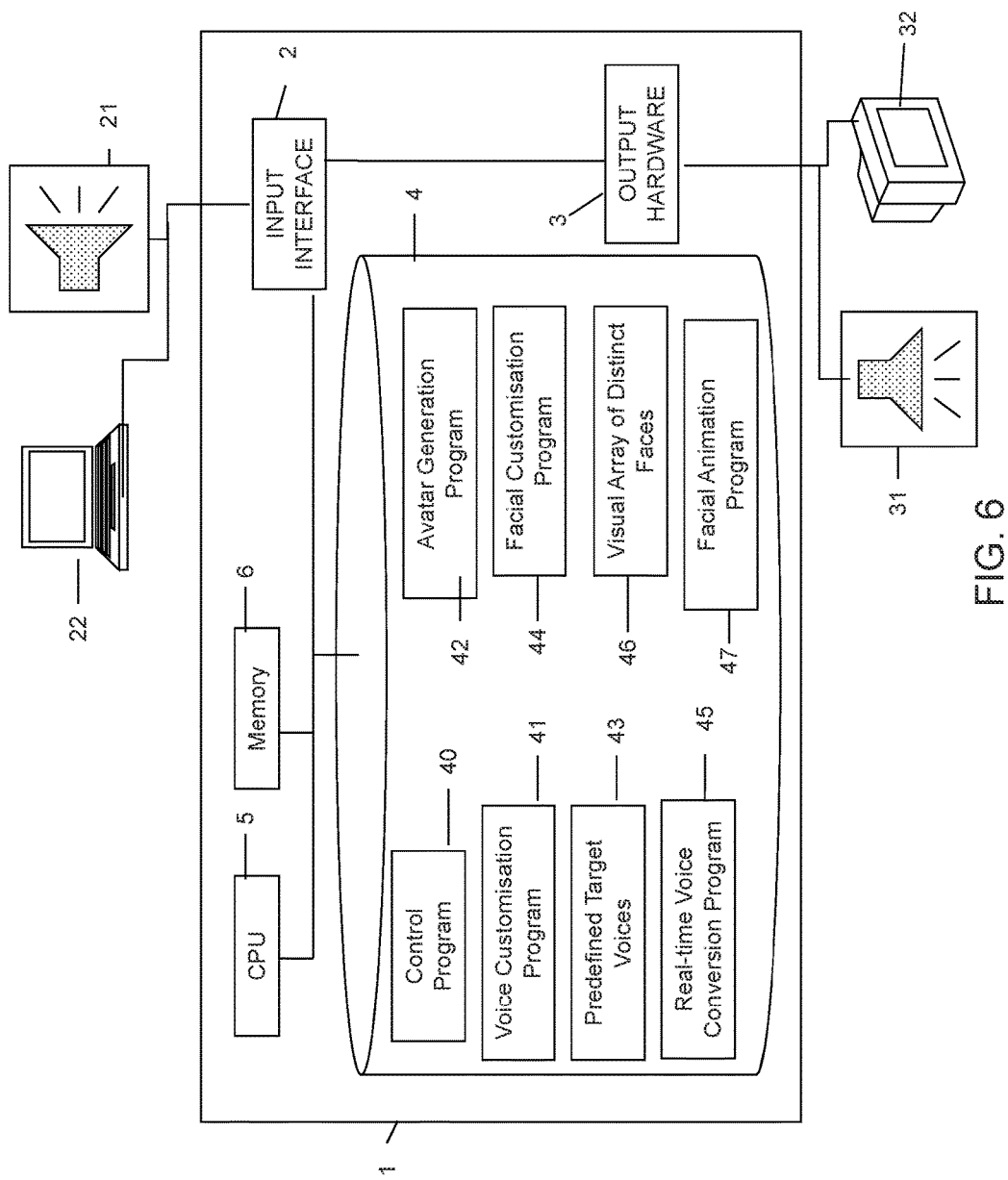
FIG. 6 is a block diagram showing an apparatus according to an embodiment of the present invention.

FIG. 6 illustrates an example of a general computer system 1 that may form the platform for embodiments of the invention. The computer system 1 comprises a central processing unit (CPU) 5, a working memory 6, and input interface 2 arranged to receive control inputs from a user via an input device 22 such as a keyboard, mouse, or other controller and output hardware 3 arranged to provide output information to a user. The input interface 2 is further arranged to receive audio inputs from the user via an audio input device 21 such as a microphone or other device capable of capturing sound. The output hardware 3 includes a visual display unit 32 such as a computer screen, television or other visual display, and an audio output device 31 such as a speaker or other device capable of producing sound.

The computer system 1 is also provided with a computer readable storage medium 4 such as hard disk drive (HDD), flash drive, solid state drive, or any other form of general purpose data storage, upon which stored data 43, 46 and various control programs are arranged to control the computer system 1 to operate in accordance with embodiments of the present invention. For example, a control program 40 is provided and arranged to provide overall control of the system to perform the embodiments of the present invention. This control program 40 may, for example, receive user inputs and launch other programs to perform specific tasks. The other programs under the control of the control program 40 include an avatar generation program 42 and facial customisation program 44 which are arranged to generate an avatar according the specifications of the user's inputs, as described above in the face selection and customisation section. A visual array of distinct faces 46 is also provided, from which the user can choose and customise. A set of predefined target voices 43 are provided from which the user may select, and subsequently customise using a voice customisation program 41 as described in the voice enrolment section. A real-time voice conversion program 45, in accordance with the voice conversion technique described previously, is also provided whereby audio inputs received via the audio input device 21 are transformed into the target voice, as customised by the user. Finally, a facial animation program 47 is provided and arranged to animate the facial movements of the generated avatar and to synchronise the lip movements of the avatar according to the output of the real-time voice conversion program 45. The facial animation procedure is described above.

It should be appreciated that various other components and systems would of course be known to the person skilled in the art to permit the computer system 1 to operate.

Figure 7:
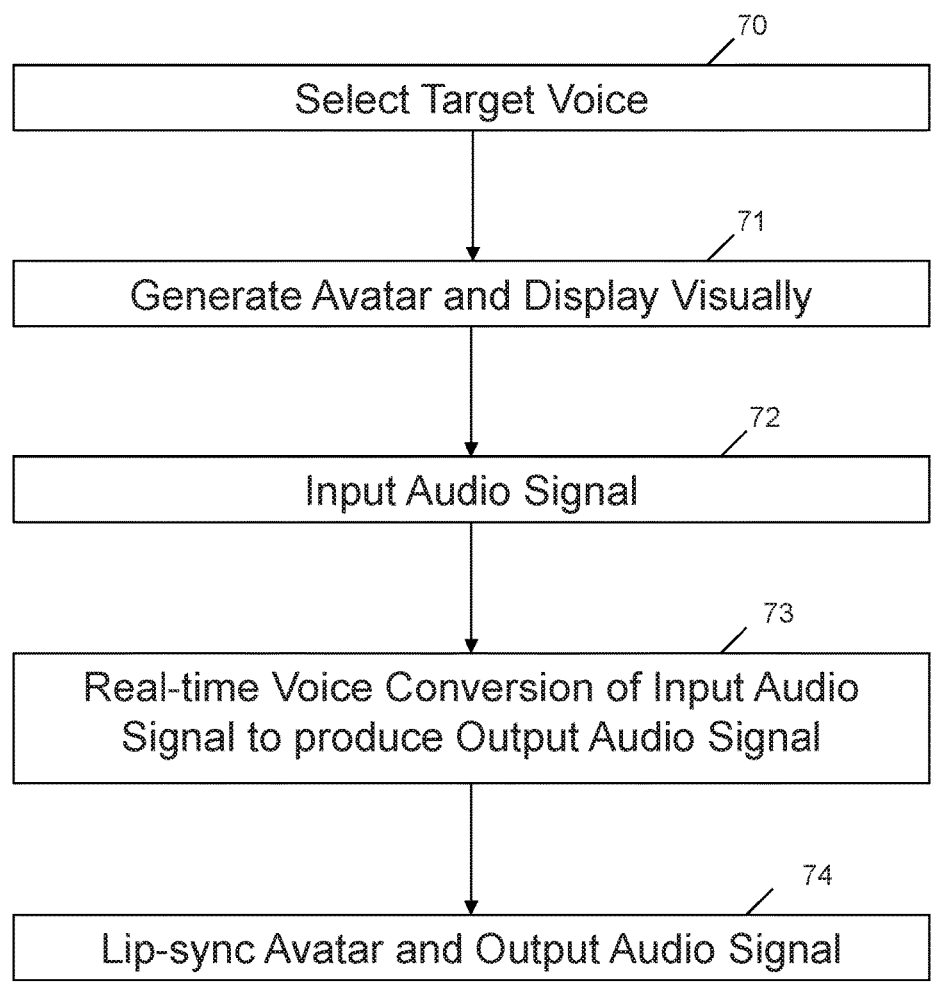
FIG. 7 is a flow diagram illustrating a method according to an embodiment of the present invention.

One application of embodiments of the present invention, as described in detail previously, is the treatment of auditory hallucinations. The computer system, as illustrated in FIG. 6, is capable of performing the audio-visual dialogue system described by the present invention and illustrated by the steps of FIG. 7. A patient suffering from auditory hallucinations may provide control inputs via the input device 22 instructing the computer system 1 to generate an avatar (step 71). The computer system 1 may comprise a readable storage medium 4 including a control program 40 arranged to provide overall control of the system. The control program 40 receives the patient's inputs, and launches an avatar generation program 42 which is arranged to generate an avatar (step 71). The control program 40 may then launch a face customisation program 44 allowing the patient to customise the generated avatar using a visual array of distinct faces 46 stored in the computer readable medium 4. Once the patient has completed facial customisation, the completed avatar is displayed on a visual display unit 32 (step 71). The control program 40 may also launch a voice customisation program 41 which is arranged to allow the patient to choose the target voice of the generated avatar such that it closely resembles their auditory hallucination (step 70). The voice customisation program 41 uses a set of predefined target voices 43 which includes a range of male and female voices from which the patient may select. The patient is then able to customise the parameters of the selected target voice, as demonstrated in FIG. 3, using a selection of sliders displayed on the input device 22 until it is a close match to the auditory hallucination.

Once the facial and voice customisation processes have been completed, a therapist and the patient may engage in conversation via the generated avatar. The therapist provides an audio input (step 72) via an audio input device 21 and the control program 40 launches a real-time voice conversion program 45 arranged to transform the audio input, that is the therapist's voice, into the target voice using the customised parameters chosen by the patient (step 73), wherein the voice conversion program employs the voice conversion technique described above. The output of the real-time voice conversion program 45 is then provided to the patient via an audio output device 31. Simultaneously, the control program 40 launches a facial animation program 47 which is arranged to animate the facial movements of the generated avatar, specifically, lip-synching the avatar in real-time with the output of the real-time voice conversion program 45 (step 74). As a result, when the therapist speaks into the input audio device 21, the avatar appears to say the words spoken by the therapist, in the voice of the patient's auditory hallucination.

Conclusions

No other study appears to exist for the treatment of auditory hallucinations using computer generated avatars. The technology used in the original pilot study was developed in a short space of time, and is now being further developed as part of a 3-year clinical trial involving a larger group of patients (140), including its extension to other languages. All the basic components are well-known in the speech field, but their combination and adaptation to suit the particular application are novel. In practice, it is relatively straightforward and cost effective to implement in a clinical setting, requiring only two standard desktop computers connected by an audio cable. Patients readily grasp the idea of the system and are motivated by it. From the psychiatric point of view, the introduction of an avatar allows researchers to study the relationship between the patients and their voices, at first hand and for the first time.

Clinical results have so far proved highly promising, with dramatic results in a small number of patients [9, 10]. Funding constraints initially allowed for only a single (male) therapist, however, the present study includes both male and female, thus expanding the set of available voices. The major aim of the new study is to replicate avatar therapy in a new setting with different therapists, to establish whether therapeutic benefits can be obtained independently by any trained therapist. Other research questions include testing the effect of the closeness of the match in the voice and face, the level of realism required to obtain the best therapeutic effect, whether the creation of the avatar is itself therapeutic, and which subgroups of patients is most likely to benefit from the therapy.

REFERENCES

[1] Kane, J. M. (1996) Treatment resistant schizophrenic patients. Journal of Clinical Psychology, 57 (suppl. 9), 35-40.

[2] Barbato, A. (1998) Schizophrenia and Public Health. Geneva: World Health Organization.

[3] Tarrier, N., Beckett, R. et al (1993) A trial of two cognitive behavioural methods of treating drug-resistant psychotic symptoms in schizophrenic patients. I: Outcome. British Journal of Psychiatry, 162, 524-532.

[4] Drury, V., Birchwood, M., Cochrane, R. & Macmillan, F. (1996) Cognitive therapy and recovery from acute psychosis: a controlled trial. I. Impact on psychotic symptoms. British Journal of Psychiatry, 169, 593-601.

[5] Kuipers, E., Fowler, D. et al (1998) London-East Anglia randomised controlled trial of cognitive-behavioural therapy for psychosis. III: follow-up and economic evaluation at 18 months. British Journal of Psychiatry, 173, 61-68.

[6] Sensky, T., Turkington, D. et al (2000) A randomised controlled trial of cognitive behavioural therapy for persistent symptoms in schizophrenia resistant to medication. Archives of General Psychiatry, 57, 165-172.

[7] Trower, P., Birchwood, M. et al (2004) Cognitive therapy for command hallucinations: randomised controlled trial. British Journal of Psychiatry, 184, 312-320.

[8] Banks, J., Ericksson, G., Burrage, K., Yellowlees, P., Ivermee, S. & Tichon, J., "Constructing the hallucinations of psychosis in Virtual Reality", Journal of Network and Computer Applications 27 (2004) 1-11.

[9] Leff, J., Williams, G., Huckvale, M., Arbuthnot, M., & Leff, A. P. (n.d.) (2013) Silencing voices: a proof-of-concept study of computer-assisted therapy for medication-resistant auditory hallucinations. British Journal of Psychiatry (in press).

[10] Leff, J., Williams, G., Huckvale, M., Arbuthnot, M., & Leff, A. P. (2013). Avatar therapy for persecutory auditory hallucinations: What is it and how does it work?. *Psychosis: Psychological, Social and Integrative Approaches.* (online, March 2013)

[11] Stylianou, Y., Cappé, O., Moulines, E., "Statistical Methods for Voice Quality Transformation", Proc. EuroSpeech 1995, Madrid, Spain, 1995.

[12] Toda, T., Black, A. W., & Tokuda, K. (2007). Voice conversion based on maximum-likelihood estimation of spectral parameter trajectory. IEEE Trans., Audio, Speech, and Language Processing, 15(8), 2222-2235.

[13] Verhelst, W, & Roelands, M., "An overlap-add technique based on waveform similarity (WSOLA) for high-quality time-scale modification of speech", IEEE Conference Acoustics, Speech and Signal Processing (1993) 554-557.

[14] D'Arcy, S. M., Russell, M. J., Browning, S. R. and Tomlinson, M. J., "The Accents of the British Isles (ABI) Corpus", Proc. Modélisations pour l'Identification des Langues, MIDL Paris, 115-119, 2004.

[15] Markham, D. & V. Hazan, "The UCL Speaker Database", Speech, Hearing and Language: UCL Work in Progress, vol. 14, p.1-17, 2002.

[16] Davis, S. B., & Mermelstein, P., "Comparison of parametric representations for monosyllabic word recognition in continuously-spoken sentences", IEEE Trans. Acoustics, Speech and Signal Processing, 28:357-366, 1980.

[17] Annosoft real-time lip-sync SDK.

[18] Massaro, D. W. (1998). Perceiving talking faces: From speech perception to a behavioral principle. Cambridge, Mass.: MIT Press.

The invention claimed is:

1. An audio-visual dialogue system, comprising:
   an audio input device;
   an audio output device;
   a visual output device; and
   a processor, the processor being arranged to:
      receive an input audio signal representing a source voice from the audio input device;
      perform substantially real-time voice conversion on the input audio signal to produce an output audio signal representing a target voice, wherein the output audio signal is provided to the audio output device, and wherein the real-time voice conversion process includes:
         i) decomposing the input audio signal into a set of time-varying filter characteristics and a residual excitation signal;
         ii) spectrally transforming the time-varying filter characteristics, and/or modifying a pitch of the residual excitation signal; and
         iii) synthesising the output audio signal in dependence on the transformed time-varying filter characteristics and/or the pitch modified residual excitation signal;
      generate an avatar, wherein the avatar is visually displayed on the visual output device; and
      facially animate the generated avatar, wherein the animation is synchronised with the output audio signal,
   wherein the processor is further arranged to customise the real-time voice conversion including
      1) selecting one of a plurality of predefined target voices, wherein the predefined target voices are represented by a set of respective linear transformations which include a set of time-varying filter characteristics and a pitch scaling factor and
      2) adjusting the transformation time-varying filter characteristics and/or the pitch scaling factor of the selected predefined target voice to give customised target voice parameters,
   wherein transform vectors of the set of linear transformations are reduced to a mean transform vector and a plurality of orthogonal change vectors and a user interface control is used to adjust a change amount by which a change vector is added into the mean transform vector such that the time-varying filter characteristics are adjusted.

2. A system according to claim 1, wherein the time-varying filter characteristics are estimated over short windowed sections of the input audio signal, and wherein the short windowed sections of the input audio signal are 20 to 40ms in duration and overlapping by 5 to 15ms.

3. A system according to claim 1, wherein the time-varying filter characteristics are Fourier transformed into a multiple point amplitude response prior to spectral transformation of the time-varying filter characteristics, and wherein the spectrally transformed amplitude response is inverse Fourier transformed back into time-varying filter characteristics.

4. A system according to claim 1, wherein a set of at least 8 linear transforms is generated between the input audio signal and a predefined target voice.

5. A system according to claim 4, wherein at least 82 predefined target voices are used, including at least 40 males target speakers and at least 42 female target speakers.

6. A system according to claim 1, wherein for a plurality of signal sections within the temporally aligned plurality of sentences:
   a) the prediction coefficients and linear prediction coding spectrum are calculated; and
   b) the optimum frequency mapping is found using a dynamic programming algorithm.

7. A system according to claim 1, wherein the selected predefined target voice is associated with a set of linear transformations.

8. A system according to claim 1, wherein the processor is further arranged to facially customise the generated avatar, wherein facially customising the generated avatar includes providing a visual array of distinct faces for selection.

9. A system according to claim 8, wherein the visual array of distinct faces includes at least 250 distinct faces.

10. A system according to claim 8, wherein the visual array of distinct faces vary in gender, age, ethnicity and hairstyle.

11. A system according to claim 8, wherein a range of accessories and further hairstyles are available for selection.

12. A system according to claim 1, wherein the audio input device and audio output device are connectable to form a two-way audio channel.

13. A method of audio-visual dialogue, comprising:
receiving an input audio signal representing a source voice from an audio input device;
performing substantially real-time voice conversion on the input audio signal to produce an output audio signal representing a target voice, wherein the output audio signal is provided to an audio output device, and wherein the substantially real-time voice conversion includes:
   i) decomposing the input audio signal into a set of time-varying filter characteristics and a residual excitation signal;
   ii) spectrally transforming the time-varying filter characteristics, and/or modifying a pitch of the residual excitation signal; and
   iii) synthesising the output audio signal in dependence on the transformed time-varying filter characteristics and/or the pitch modified residual excitation signal;
generating an avatar, wherein the avatar is visually displayed on a visual output device;
facially animating the generated avatar, wherein the animation is synchronised with the output audio signal; and
customising the real-time voice conversion including
   1) selecting one of a plurality of predefined target voices, wherein the predefined target voices are represented by a set of respective linear transformations which include a set of time-varying filter characteristics and a pitch scaling factor; and
   2) adjusting the transformation time-varying filter characteristics and/or the pitch scaling factor of the selected predefined target voice to give customised target voice parameters,
wherein transform vectors of the set of linear transformations are reduced to a mean transform vector and a plurality of orthogonal change vectors and a user interface control is used to adjust a change amount by which a change vector is added into the mean transform vector such that the time-varying filter characteristics are adjusted.

14. A method of audio-visual dialogue, comprising:
receiving an input audio signal representing a source voice from an audio input device; performing substantially real-time voice conversion on the input audio signal to produce an output audio signal representing a target voice, wherein the output audio signal is provided to an audio output device, and wherein the substantially real-time voice conversion includes:
   i) decomposing the input audio signal into a set of time-varying filter characteristics and a residual excitation signal;
   ii) spectrally transforming the time-varying filter characteristics, and/or modifying a pitch of the residual excitation signal; and
   iii) synthesising the output audio signal in dependence on the transformed time-varying filter characteristics and/or the pitch modified residual excitation signal;
generating an avatar, wherein the avatar is visually displayed on a visual output device;
facially animating the generated avatar, wherein the animation is synchronised with the output audio signal; and
customising the real-time voice conversion including
   1) selecting one of a plurality of predefined target voices, wherein the predefined target voices are represented by a set of respective linear transformations which include a set of time-varying filter characteristics and a pitch scaling factor; and
   2) adjusting the transformation time-varying filter characteristics and/or the pitch scaling factor of the selected predefined target voice to give customised target voice parameters,
wherein the time-varying filter characteristics and/or the pitch scaling factor of the selected predefined target voice are adjusted using a plurality of sliders displayed on a user interface which when activated by the user set a change amount by which the time-varying filter characteristics and/or the pitch scaling factor are adjusted and
wherein transform vectors of the set of linear transforms are reduced to a mean transform vector and a plurality of orthogonal change vectors and a user interface control is used to adjust a change amount by which a change vector is added into the mean transform vector such that the time-varying filter characteristics are adjusted.

15. An audio-visual dialogue system, comprising:
an audio input device;
an audio output device;
a visual output device; and
a processor, the processor being arranged to:
   receive an input audio signal representing a source voice from the audio input device;
   perform substantially real-time voice conversion on the input audio signal to produce an output audio signal representing a target voice, wherein the output audio signal is provided to the audio output device, and wherein the real-time voice conversion process includes:
      i) decomposing the input audio signal into a set of time-varying filter characteristics and a residual excitation signal;
      ii) spectrally transforming the time-varying filter characteristics, and/or modifying a pitch of the residual excitation signal; and
      iii) synthesising the output audio signal in dependence on the transformed time-varying filter characteristics and/or the pitch modified residual excitation signal;
   generate an avatar, wherein the avatar is visually displayed on the visual output device; and
   facially animate the generated avatar, wherein the animation is synchronised with the output audio signal,
wherein the processor is further arranged to customise the real-time voice conversion including
   1) selecting one of a plurality of predefined target voices, wherein the predefined target voices are represented by a set of respective linear transformations which include a set of time-varying filter characteristics and a pitch scaling factor; and 2) adjusting the transformation time-varying filter characteristics and/or the pitch scaling factor of the selected predefined target voice to give customised target voice parameters, wherein the time-varying filter characteristics and/or the pitch scaling factor of the selected predefined target voice are adjusted using a plurality of sliders displayed on a user interface which when activated by the user set a change amount by which the time-varying filter characteristics and/or the pitch scaling factor are adjusted and wherein transform vectors of the set of linear transforms are reduced to a mean transform vector and a plurality of orthogonal change vectors and a user interface control is used to adjust a change amount by which a change vector is added into the mean transform vector such that the time-varying filter characteristics are adjusted.

* * * * *